US007760842B2

(12) United States Patent
Helmersson et al.

(10) Patent No.: US 7,760,842 B2
(45) Date of Patent: Jul. 20, 2010

(54) METHOD AND APPARATUS OF ESTIMATING DRYOUT PROPERTIES IN A NUCLEAR LIGHT WATER REACTOR

(75) Inventors: Sture Helmersson, Kolbäck (SE); Mahdi Majed, Västerås (SE); Gunilla Norbäck, Västerås (SE); Dmitry Paramonov, Monroeville, PA (US); Rolf Eklund, Västerås (SE); Carl Adamsson, Västerås (SE)

(73) Assignee: Westinghouse Electric Sweden AB, Vasteras (SE)

( * ) Notice: Subject to any disclaimer, the term of this patent is extended or adjusted under 35 U.S.C. 154(b) by 0 days.

(21) Appl. No.: 11/512,938

(22) Filed: Aug. 29, 2006

(65) Prior Publication Data

US 2010/0158185 A1 Jun. 24, 2010

(30) Foreign Application Priority Data

Aug. 31, 2005 (SE) .................................. 0501931

(51) Int. Cl.
*G21C 9/00* (2006.01)
(52) U.S. Cl. .................. 376/277; 376/245; 376/254
(58) Field of Classification Search ................. 376/277, 376/245, 254
See application file for complete search history.

(56) References Cited

U.S. PATENT DOCUMENTS

| 4,774,049 | A | * | 9/1988 | Impink et al. ............... 376/245 |
| 5,912,933 | A | * | 6/1999 | Shaug et al. ................ 376/216 |
| 6,061,412 | A | * | 5/2000 | Stucker et al. .............. 376/217 |
| 6,721,383 | B2 | * | 4/2004 | Casillas et al. .............. 376/245 |

FOREIGN PATENT DOCUMENTS

| DE | 4416463 A1 | 11/1994 |
| EP | 0405863 A2 | 1/1991 |
| EP | 1113457 A1 | 7/2001 |
| EP | 1221701 A1 | 7/2002 |
| EP | A1 1 221 701 | 7/2002 |
| JP | 02-130498 A | 5/1990 |
| SE | 509 235 | 12/1998 |

OTHER PUBLICATIONS

Nishida et al. "Critical power prediction method for core thermal-hydraulic evaluation based on liquid film flow model", Journal of Nuclear science and Technology, 31 (4), pp. 352-354, (1994).*
Adamsson et al. "Enhance Fuel Performance and reduce life-cycle cost", Westinghouse World News, Aug. 2005, pp. 17-18.*
Uffe Bergmann et al., Advanced Dryout Correlation and CPR Methodology for Westinghouse SVEA-96 Optima3 Fuel, Advances in Nuclear Fuel Management IV (ANFM 2009) pp. 1-17.

* cited by examiner

*Primary Examiner*—Rick Palabrica
(74) *Attorney, Agent, or Firm*—Michaud-Kinney Group, LLP

(57) ABSTRACT

The invention concerns a method of estimating when dryout may occur in a nuclear light water reactor of the boiling water reactor kind. The method includes the use of a formula which expresses the local dryout property of the nuclear reactor. The formula includes at least a first and a second factor. The first factor is a first function that describes how the dryout property depends on the flow of the cooling medium through the nuclear fuel arrangement. The second factor is a second function that describes how the dryout property depends on the axial power profile of the nuclear fuel arrangement. The first and the second functions describe said flow dependence and said axial power profile dependence independently of each other. The invention also concerns a nuclear energy plant, a computer program product (23) and a method of operating a nuclear energy plant.

18 Claims, 1 Drawing Sheet

METHOD AND APPARATUS OF ESTIMATING DRYOUT PROPERTIES IN A NUCLEAR LIGHT WATER REACTOR

This application claims the priority of Swedish patent application number 0501931-0, filed 31 Aug. 2005, which is hereby incorporated herein by reference, in its entirety.

FIELD OF THE INVENTION

The present invention relates to a method of estimating when dryout may occur in a nuclear light water reactor, more precisely in a boiling water reactor (BWR). The invention can be used to estimate the dryout risk (or the margin to dryout) when the nuclear reactor is in operation, but also to make an estimation of the dryout risk before the nuclear reactor is actually operating, for example for estimating the dryout properties before a new nuclear fuel is delivered to a nuclear energy plant or when planning the core design for refuelling.

The invention also concerns a nuclear energy plant, a computer program product and a method of operating a nuclear energy plant.

TECHNICAL BACKGROUND AND PRIOR ART

The fuel rods in a BWR core are grouped in bundles with spacers and usually also end plates to keep the fuel rods in each bundle in a predetermined geometry. The predetermined rod lattice may be regular or irregular and even change axially. The bundles are then enclosed by channels to direct the coolant flow upward and give the fuel arrangement mechanical and thermal hydraulic stability and facilitate handling and exchange of the fuel. The fuel rod bundle and the channel are often referred to as a fuel assembly as the handling unit. Each channel may also contain more than one fuel bundle and still be referred to as a fuel assembly. The channels may be square or hexagonal and have internal structures and features apart from end fittings. The fuel bundle may also vary considerably in size—from 24 to 144 fuel rods—and it may also contain special purpose rods such as tie rods, water rods, part length rods and burnable absorber rods. A multitude of fissile material enrichments both between and within the fuel rods is also common. The present invention is applicable to all of these fuel arrangements and their operation in the reactor.

As is well known to a person skilled in the art, in a BWR a cooling medium in the form of water flows through the fuel assemblies, which contain the fuel rods. The purpose of the water is to cool the fuel rods and to act as a neutron moderator. A mixture of steam and water is flowing through the fuel bundle, providing cooling for the rods by convective and boiling heat transfer. As the steam quality (the steam content fraction) of the coolant increases, the flow pattern is changing. At a certain point in the bundle, an annular flow pattern is formed. This implies existence of a thin liquid film on the surface of the rods, and a mixture of vapour and droplets in the channels between the rods. The existence of this film allows for efficient heat transfer from the rods to the coolant. This enables both effective steam generation and prevents the rods from overheating. The breakdown of this film is referred to as dryout.

In a BWR dryout should be avoided. Dryout deteriorates heat transfer from the fuel rods to the reactor cooling medium and therefore leads to an increased temperature of the walls of the fuel rods. The increased temperature can damage the fuel rods. If a BWR is operated at or above a certain high power, the so-called critical power (CP), dryout may thus occur. In order to avoid dryout, the reactor is therefore operated at, a lower power, such that a certain safety margin exists, the so-called dryout margin. A measure of the dryout margin is the critical power ratio (CPR). The CPR can be defined as the following ratio:

$$CPR = (\text{critical power})/(\text{actual power})$$

The CPR can be calculated locally for a large number of points in the reactor core. The smallest value of the CPR in any point is called the minimum critical power ratio MCPR.

In the following critical power and critical heat flux and critical steam quality are treated as synonymous or equivalent entities as there exist straight forward physical transformation laws between them in steady state operation. With the coolant flow and the inlet enthalpy known the steam quality directly provides the fuel arrangement power with steam/water thermodynamic data and vice versa.

There are two common methods used to correlate critical power test data for BWR fuel assemblies. Both are based on observed functional dependencies between the experimental parameters. One is to correlate the critical power data with the critical heat flux and the other method is to correlate the critical power test data with critical steam quality and the so-called boiling length as the main variables The critical heat flux correlation is based upon a so-called relaxed local conditions hypothesis. This type of correlation is based on Macbeth and Barnett's well known linear dependence between critical dryout power and subcooling at constant mass flux and pressure. The local condition hypotheses correlation has the following form:

$$\Phi_{DO,z} = f(P, D, G, X_z)$$

where $\Phi_{DO,z}$ = heat flux at dryout

P = system pressure

D = fuel hydraulic diameter

G = mass flux $X_z$ = steam quality at axial position z in reactor core

Linear dependencies between the parameters are established at least piecewise by use of fitting coefficients to the measured data. Combination of local dryout heat flux and heat balance allows calculation of critical power and includes implicitly the influence of axial heat flux distribution or power shape.

The other method is to correlate the critical steam quality (power) and capture the dependence of critical power on mass flux, pressure, inlet subcooling, and axial and radial power distributions. The terms in a critical quality-boiling length correlation are best-fit functions that describe the critical steam quality dependence on mass flux, outlet pressure, boiling length, annular length and R-factor based on the test data and has the following form:

$$X_{DO} = f(G, P, BL, AL, R)$$

where $X_{DO}$ = critical steam quality

G = mass flux

P = system pressure

BL = boiling length

AL = annular flow length

R = R-factor. It is typically postulated to capture the critical quality dependence on lateral flow and power distributions.

The critical power can be predicted from the steam quality by using the heat balance along the channel. This is an iterative process and includes the influence of axial shape implicitly. Critical power test data are correlated in the so-called critical quality-boiling length plane, i.e. critical power, mass flux, pressure and inlet sub-cooling data are converted to a relationship between steam quality at the location where dryout occurs and the so-called boiling length, BL. Boiling length is defined as the distance from the starting point of bulk boiling (Blen) to the end of heated length, EHL. Furthermore it has been shown that a critical quality—boiling length correlation with the annular boiling length, AL, as an additional correlation parameter implicitly handles the influence of the axial power shape on critical power properly. AL is the distance from the annular flow transition point to the end of heated length, EHL.

Dryout dependence on the local power distribution, cross section geometry, and the grid spacer configuration is handled through the use of a so-called R-factor. These R-factors are a measure of the dryout sensitivity of each rod. The limiting R-factor of a sub-bundle is the maximum of R-factors of its rods. In tests, the peak power rod has been systematically moved around in the sub-bundle in order to investigate the dryout sensitivity of rod positions. The large number of local power distributions tested has allowed a derivation of empirical additive constants to calculated R-factors.

The two common methods to correlate dryout data have with time and increasing demands for accuracy and validity range became complex. The correlations are basically linear forms (polynomials), but with many terms and regression coefficients trying to capture highly non-linear effects.

The document SE-C2-509 235 describes a method of estimating the risk for dryout in a BWR. In this method so-called transient phenomena are taken into account. A transient can for example occur when the coolant flow is reduced while maintaining the actual reactor power. This leads to a reduction of the CP. The method includes the use of a transient analyser. In the transient analyser the behavior of the nuclear reactor during a transient is simulated. The transient analyser calculates the reduction of the CP during transients.

EP-A1-1 221 701 describes a method and system for thermal-dynamic modeling and performance evaluation of a BWR core design. A data processing system is used to execute specific program routines that simulate the thermal operating characteristics of fuel rods within the reactor during a transient operational condition. The method employs a multi-dimensional approach for the simulation of postulated operational events or an anticipated operational occurrence which produces a transient condition in the reactor, such as might be caused by single operator error or equipment malfunction. Based on a generic transient bias and uncertainty in the change in critical power ratio, histograms of fuel rod critical power ratio are generated. Ultimately, the operating limit minimum critical power ratio of the reactor is evaluated from a histogram of probability calculations representing the number of fuel rods subject to a boiling transition during the transient condition. The histogram may be readily displayed by the data processing system and used to statistically demonstrate an operating limit minimum critical power ratio compliance of the reactor core design with official regulations.

Dryout properties in a real nuclear reactor application can be estimated on the basis of experiments in an experiment station. This experiment station is made to be similar to a part of a real reactor core, but no nuclear reaction takes place in the experiment station. The experiment station can include an experiment chamber in which a number of simulated nuclear fuel rods (but without the nuclear fuel material) are positioned relative to each other in the same manner (or a similar manner) to the fuel rods in a real nuclear reactor core. However, the number of fuel rods in the experiment station is usually much less than in a real reactor core that may contain from 40000 to 80000 or more rods. For example, 24 fuel rods can be used in the experiment station. These fuel rods can represent a sub-bundle of a bundle of fuel rods of a real fuel arrangement. The fuel rods in the experiment station are provided with electrical heater elements so that they can be heated to at least the same temperatures as the fuel rods in a real nuclear reactor. The electrical current to the heater elements can be varied in order to simulate different power levels and power distributions that can occur in a real nuclear reactor core. Furthermore, water is fed through the experiment chamber. The temperature, the mass flux of water, axial and radial power shapes and the pressure of the water can be varied in order to simulate different operation conditions and transient behavior.

The experiment station is provided with different measurement means in order to measure the mass flux, the pressure and the temperature at different positions in the experiment station. However, the number of measurement points and the different measurements that can be performed in a limited time is limited. It is therefore often difficult to estimate the dryout properties in a real nuclear reactor on the direct basis of such experiments.

Since the number of measurement points, and the number of different measurements that are carried out, are limited, it is necessary to find a model (often called a correlation) that predicts the behaviour of a nuclear fuel arrangement between and outside the conditions that have actually been measured in the experiment station. It is a difficult process to interpolate and extrapolate the result from the experiment to a real general description of the dryout behaviour with high accuracy in a real nuclear reactor.

SUMMARY OF THE INVENTION

A method of estimating when dryout may occur in a nuclear light water reactor of the boiling water reactor kind, which reactor includes a nuclear fuel arrangement, which method is characterised in that it includes receiving data that indicates operation parameters for the reactor and processing the data by the use of a formula which expresses the local dryout property of the nuclear reactor, wherein said formula includes at least a first and a second factor, wherein the first factor is a first function that describes how the dryout property depends on the flow of the cooling medium through the nuclear fuel arrangement and the second factor is a second function that describes how the dryout property depends on the axial power profile of the nuclear fuel arrangement, wherein the first and the second functions independently of each other describe said flow dependence and said axial power profile dependence, respectively.

According to one optional aspect of the invention, the second factor may comprise a single mathematical transformation to the axial power profile which includes at least one variable related to a longitudinal direction of the nuclear fuel arrangement, parallel to the direction in which a fuel rod in the fuel arrangement extends.

In a particular embodiment, the formula may have substantially the following form:

$$X_{DO} = e^{\left(\frac{1}{1+e^{(a_1+a_2 G)}} + \frac{a_3}{I_2+f(Acc)} + \alpha_4 R\right)} \rho_{rel}^{\alpha_5} h_{fg}^{\alpha_6}$$

where $X_{DO}$ is the predicted local steam quality at dryout,

G is the mass flow of cooling medium through the nuclear fuel arrangement per area and time, $I_2$ is the transformation of the axial power distribution, $f(Acc)$ is a function of a flow acceleration term, which function describes transient effects captured through the flow acceleration term, R is the weighted local power influence from the neighbour nuclear fuel rods, $\rho_{rel}$ is the relative steam density, $h_{fg}$ is the latent heat for evaporation of the cooling medium, $\alpha_1$ to $\alpha_6$ are fitting coefficients specific for the specific fuel arrangement used.

A nuclear energy plant comprising a nuclear light water reactor of the boiling water reactor kind comprises a control unit arranged to carry out a method as described herein.

A computer-readable medium comprises executable code to enable a computer to receive data pertaining to operating conditions of a nuclear power plant; and to use the data to calculate an estimated dryout time using a formula that includes at least a first and a second factor, wherein the first factor is a first function that describes how the dryout property depends on the flow of the cooling medium through the nuclear fuel arrangement and the second factor is a second function that describes how the dryout property depends on the axial power profile of the nuclear fuel arrangement, wherein the first and the second functions independently of each other describe said flow dependence and said axial power profile dependence, respectively.

A method of operating a nuclear energy plant comprising a nuclear light water reactor of the boiling water reactor kind, wherein said method comprising: receiving information concerning operation parameters of the nuclear reactor, using this information to estimate the dryout time of the reactor in a method as described herein, and controlling the operation of the nuclear reactor in dependence on the result of the estimate.

BRIEF DESCRIPTION OF THE DRAWING

The FIGURE is a schematic representation of a nuclear energy plant comprising a control unit according to one embodiment of this invention.

DESCRIPTION OF EMBODIMENTS OF THE INVENTION

Figure 1:
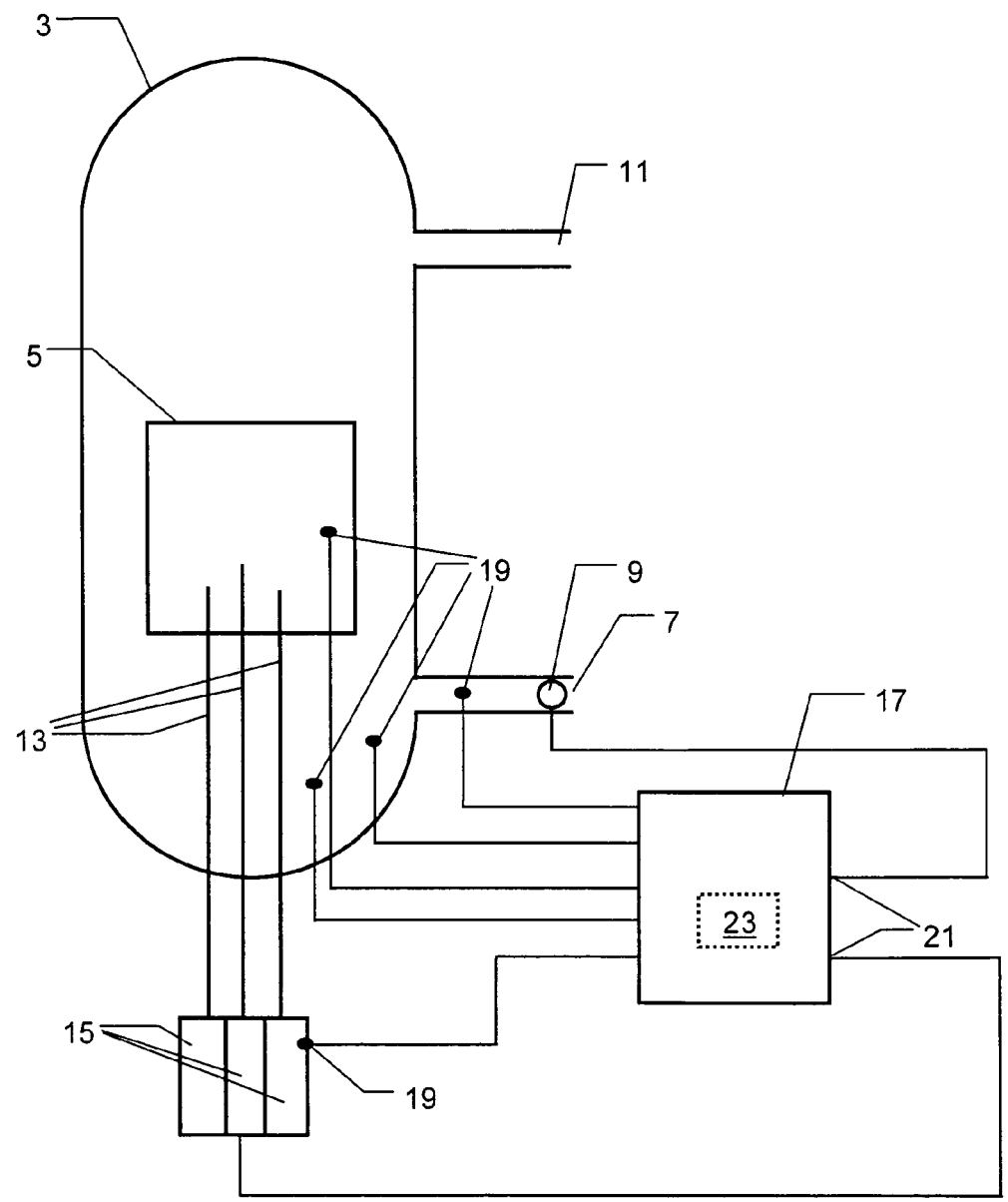

Methods of estimating when dryout may occur in a nuclear light water reactor of the boiling water reactor kind are disclosed herein. The reactor includes a nuclear fuel arrangement. For making such estimations, a method may employ a formula which expresses the local dryout property of the nuclear reactor.

In various embodiments, the formula includes at least two, optionally three or four, different factors. The first factor is a first function that describes how the dryout property depends on the flow of the cooling medium through the nuclear fuel arrangement. The second factor is a second function that describes how the dryout property depends on the axial power profile of the nuclear fuel arrangement.

An optional third factor is a third function, which describes how the dryout property depends on the R-factor of the nuclear fuel arrangement. The R-factor is the weighted local power influence from the neighbour nuclear fuel rods.

An optional fourth factor is a fourth function, which describes how the dryout property depends on the pressure of the cooling medium in the nuclear fuel arrangement.

The first to fourth functions independently of each other, describe, respectively, said flow dependence, said axial power profile dependence, said R-factor dependence and said pressure dependence.

A method disclosed herein facilitates the estimation of conditions under which dryout may occur in a nuclear light water reactor of the boiling water reactor kind. The method can be used to estimate the dryout behaviour of a real nuclear reactor on the basis of experiments in an experiment station. An ability to estimate dryout conditions in a boiling water reactor is useful for the control and operation of a nuclear light water reactor.

The method makes use of a formula which expresses the local dryout property of the nuclear reactor. Since the dryout property is expressed in a formula, it is easy to adapt this formula to different actual operation conditions. Furthermore, the formula employs the first and second functions that describe said flow dependence and said axial power profile dependence, respectively, independently of each other. Accordingly, the formula can have a simple form that makes it easy to apply to various nuclear fuel arrangements.

The dryout properties can thus be expressed with sufficient accuracy by a single, relatively simple, formula.

The method can be used to estimate the margin to dryout when a nuclear reactor is in operation. Reactor operation always has to assure that a certain class of transients may occur at any time and the method can also be used to estimate the dryout risk during such transients. Alternatively, the method can be used to make an estimation of the dryout risk before the nuclear reactor is actually operating, for example for estimating the dryout properties before a new nuclear fuel is delivered to a nuclear energy plant or when planning the core design for refuelling.

A mathematical expression can normally be written in different manners and still have the same meaning, or approximately the same meaning. Consequently, the claims should not be seen as being limited to the exact mathematical expression defined therein. Rather, the claims are intended to cover equivalent expressions of the formula and alternative formulations that constitute approximations of the formula. Such transformations are regularly done for numerical evaluations and can be tailored for high accuracy over a predetermined application range. For example, an exponential function as defined in claim 18 could be transformed into some other mathematical expression without changing the meaning of the formula, or the formula could, for example, be expressed as a polynomial or a truncated power series that approximates the formula. The claims are also intended to cover small alterations and adjustments of the formulas, for example the addition of small factors or terms that do not significantly change the overall meaning of the formula.

Similarly, metric or SI units have been assumed in the numerical examples. The invention will work also with other units if parameters and coefficients are adjusted accordingly.

It should also be noted that the concept "entity" used in connection with the formula refers to any entity in the formula, for example a term or a factor that forms part of a term.

Furthermore, when a symbol, for example G, is used in the claims, this does of course not mean that the formula is limited to use this particular symbol. Any other symbol can of course be used to symbolise the quantity in question.

It should also be mentioned that the dryout property can be expressed in different manners. The dryout property can be calculated for an arbitrary position anywhere in the nuclear fuel arrangement, or can be calculated for a specific position, for example where the cooling medium exits from the active part of the nuclear fuel arrangement. However, based on such calculations of the dryout properties in different points, for example the dryout margin, or the minimum critical power ratio (MCPR), can be calculated for the whole nuclear reactor. Since how to calculate for example the MCPR, based on knowledge of the dryout properties in different locations in the nuclear fuel arrangement, is known to a person skilled in the art, this will not be described in this document. What is important to the present invention is to provide a method in which a formula is used, on the basis of which for example the MCPR can be calculated in a simple manner without loss of accuracy. The dryout property mentioned in claim 1 thus constitutes a local dryout property that easily can be used for, for example, determining the MCPR.

Various optional aspects of the method according to the invention are described herein and are set forth in various dependent claims.

According to one optional aspect of the invention, said formula also includes a third function, which is either a factor or a term in the formula, wherein the third function describes how the dryout property depends on the R-factor of the nuclear fuel arrangement, wherein the R-factor is the weighted local power influence from the neighbour nuclear fuel rods, wherein the third function describes said R-factor dependence independently of said flow dependence and said axial power profile dependence. Preferably, said third function is a factor in the formula. By using a third function that independently describes the R-factor dependence, a further simplified formula is obtained.

According to another optional aspect of the invention, said formula also includes a fourth function, which is either a factor or a term in the formula. The fourth function describes how the dryout property depends on the pressure of the cooling medium in the nuclear fuel arrangement, and it describes said pressure dependence independently of said flow dependence, said axial power profile dependence and said R-factor dependence.

Preferably, said fourth function is a factor in the formula. By using a fourth function that independently describes the pressure dependence, a further simplified formula is obtained.

According to still another aspect, the fourth function may include an entity $h_{fg}$, where $h_{fg}$ is the latent heat for evaporation of the cooling medium. The fourth function may include an entity proportional to the density of the vapour of the cooling medium at the actual pressure. In this manner, the pressure dependence can be expressed accurately in a simple manner.

The formula is such that it includes an exponential function, which, in the exponent, includes another exponential function. The different functions, which form factors in the formula, can be easily expressed in such an exponential function.

According to yet another optional aspect, the formula includes a number of variables, a number of constants, and a number of fitting coefficients, wherein said fitting coefficients are determined for the specific used nuclear fuel arrangement, such that said fitting coefficients, at least within certain limited variations of the operation conditions for the nuclear reactor, with an acceptable estimation result, can be considered as constants for the used nuclear fuel arrangement. Preferably, the formula is such that only the fitting coefficients have to be adjusted in order for the formula to be applicable to a particular nuclear fuel arrangement. Furthermore, in a specific example, all the fitting coefficients, or at least some of the fitting coefficients, are significant fitting coefficients that play an important role in order for the formula to express the dryout property with sufficient accuracy, and wherein the number of significant fitting coefficients in said formula is less than 10.

The concept "fitting coefficients" relates to coefficients used in the formula in order to make the formula correctly represent a certain nuclear fuel arrangement and reproduce the measured dryout data with optimum accuracy. This implies that when the formula is used for another kind of fuel arrangement, only the fitting coefficients have to be adapted to the new fuel arrangement. By "significant fitting coefficient" is meant a fitting coefficient that plays an important role in order for the formula to express the dryout property of the nuclear reactor with sufficient accuracy. The statistical significance of a particular coefficient is determined by standard statistical methods. In addition to the significant fitting coefficients, of course less significant fitting coefficients could be included in the formula. Since the number of significant fitting coefficients, according an embodiment of the invention, is less than 10, it is quite easy to adapt the formula to a particular situation based on a limited number of experiments.

In the prior art descriptions of the dryout properties, the number of required fitting coefficients have been very high. When those correlation concepts were first developed they were simple and with few coefficients. With time the requirements for accuracy and validity range have grown. Those requirements have been met by adding more and more coefficients. Since the number of coefficients that have to be adjusted have become very high, it has previously been difficult to find the values of these coefficients on the basis of small experimental data sets. Furthermore, the large number of regression coefficients results in poor extrapolation behavior of prior art correlations. That is, when a correlation is used to extrapolate outside of the experimental database it is based on, correlation predictions might be significantly different from what is expected based on physical knowledge available from unrelated experiments or sophisticated numerical analyses based on first principles.

These problems are solved by the present invention, since according to an advantageous aspect of the present invention, the number of significant fitting coefficients is low.

The fitting coefficients used in the formulas in this document are normally, obtained mathematically by regression techniques. Therefore, the concept "regression coefficient" is often used in the description below. The mentioned regression coefficients are thus fitting coefficients.

According to a further aspect of the invention, said second function comprises a single mathematical transformation to the axial power profile which includes at least one variable related to a longitudinal direction of the nuclear fuel arrangement, parallel to the direction in which a fuel rod in the fuel arrangement extends. It is an advantageous aspect of the invention that the mentioned second function can be expressed in such a simple manner.

For example, the transformation may be in the form of Equation (1):

$$I_2 = \frac{1}{x(Z_{DO})} \int_{ZX0}^{Z_{DO}} x(z)\,dz \qquad (1)$$

where x(z) is the steam quality profile along the fuel bundle, z is a local spatial variable related to a longitudinal direction of the nuclear fuel arrangement, parallel to the direction in which a fuel rod in the fuel arrangement extends, and wherein the integration extends from the onset of net boiling, ZX0 and the integration ends at $Z_{DO}$, which is defined as the axial position for dryout.

Optionally, the transformation takes transient phenomena into account and has the form of Equation (2):

$$I_2(t_{DO}) = \frac{1}{x(Z_{DO}(t_{DO}))} \int_{ZX0(t_{in})}^{Z_{DO}(t_{DO})} x(t(t_{in},z),z)\,dz \qquad (2)$$

where z is a local spatial variable related to a longitudinal direction of the nuclear fuel arrangement, parallel to the direction in which a fuel rod in the fuel arrangement extends, t is the time during the transient, $t_{in}$ is the time during the transient when the particle experiencing dryout at $t_{DO}$ entered the bundle of fuel rods, $t_{DO}$ is the time when a fluid particle is experiencing dryout, $Z_{DO}(t_{DO})$ is the time-dependent axial position for dryout for this fluid particle, and $ZX0(t_{in})$ is the point where this fluid particle reaches the point of net boiling.

With the present invention, thus also transient phenomena can be taken into account in a simple manner.

According to a further aspect of the invention, the mentioned transformation may form part of the exponent in the first mentioned exponential function. The transformation can thereby be included in the formula in a simple manner.

According to another aspect of the invention, said first function may include an entity G, where G is the mass flow of cooling medium through the nuclear fuel arrangement per area and time, wherein G is constant in a stationary state of the operation of the nuclear reactor. Since G is a normally used entity, it is advantageous if this entity is used in the method according to the invention.

It is advantageous if the entity G appears in the exponential function that appears in the exponent of the first mentioned exponential function.

In one embodiment, the formula may have substantially the form of Equation (3):

$$X_{DO} = e^{\left(\frac{1}{1+e^{(\alpha_1+\alpha_2 G + \frac{\alpha_3}{I_2+f(Acc)}+\alpha_4 R)}}\right)} \rho_{rel}^{\alpha_5} h_{fg}^{\alpha_6} \qquad (3)$$

where $X_{DO}$ is the predicted local steam quality at dryout,

G is the mass flow of cooling medium through the nuclear fuel arrangement per area and time, $I_2$ is the transformation of the axial power distribution, $f(Acc)$ is a function of a flow acceleration term, which function describes transient effects captured through the flow acceleration term, R is the weighted local power influence from the neighbour nuclear fuel rods, $\rho_{rel}$ is the relative steam density, $h_{fg}$ is the latent heat for evaporation of the cooling medium, $\alpha_1$ to $\alpha_6$ are fitting coefficients specific for the specific fuel arrangement used.

This formula thus constitutes a simple general formula that can be used in the method according to the invention and that in a simple manner describes a local dryout property of the nuclear fuel arrangement and also takes transient phenomena into account.

In one particular embodiment, $$f(Acc) = \alpha_7 Acc^2$$

where the acceleration term Acc is defined as in Equation (4)

$$Acc = \int_0^{Z_{DO}} \frac{1}{u_f^2(t,z)} \frac{\partial u_f}{\partial t}\,dz \qquad (4)$$

where $u_f$ is the axial velocity of the liquid film on the nuclear fuel rods or its approximation, t is the time during the transient, z is a local spatial variable related to a longitudinal direction of the nuclear fuel arrangement, parallel to the direction in which a fuel rod in the fuel arrangement extends, $Z_{DO}$ is defined as the time dependent axial position for dryout, and $\alpha_7$ is a fitting coefficient specific for the specific fuel arrangement used.

With such an acceleration term the transients can be taken into account in a simple manner.

The invention facilitates estimating the dryout conditions, such as the dryout margin, during operation.

The invention may be practiced in a nuclear energy plant that comprises a nuclear light water reactor of the boiling water reactor kind, which plant comprises a control unit arranged to carry out a method as described herein. As a result, the plant has means to obtain information, in a relatively simple manner, concerning the dryout properties during operation of the nuclear energy plant.

According to one embodiment, a nuclear energy plant includes operation parameter detectors arranged to detect operation parameters of the nuclear reactor during operation. The control unit is arranged to receive information concerning said operation parameters from the detectors and to use these operation parameters when carrying out the method described herein. The control unit, or the plant, thus uses the received information from the detectors for calculating, for example, the dryout margin for different parts of the nuclear reactor core.

According to a further embodiment, the control unit comprises control outputs arranged to control the operation of the nuclear reactor in dependence on said method carried out by the control unit. According to this embodiment, the control unit can thus automatically control the operation of the nuclear energy plant, for example in order ensure that always a certain dryout margin is maintained.

Methods described herein can be implemented as a computer program product directly loadable into the internal memory of a computer which can form part of a control unit as defined above. The computer program product comprises a computer program configured to carry out a method according to any one of the above embodiments.

In another embodiment, the invention provides a method of operating a nuclear energy plant comprising a nuclear light water reactor of the boiling water reactor kind, wherein said method comprises:

providing information concerning operation parameters of the nuclear reactor;

using this information in a method as described herein; and controlling the operation of the nuclear reactor in dependence on the previous method step.

With such a method, advantages corresponding to those described above in connection with the method and the nuclear energy plant according to the invention are achieved.

Different features of the formula used in a manner of carrying out the method described method described herein will now be explained. In order to improve the understanding of the invention, some explanatory remarks referring to the prior art are sometimes included.

The used formula describes the dependence (correlation) between reactor operating conditions and dryout conditions during steady-state and transient operation of a light water reactor.

1. Mathematical transformation to describe shape of the axial power profile during steady-state reactor operation.

In the prior art, the effect of axial power profile distribution on dryout properties was captured by:

introducing parameters capturing upstream flow history, BL and AL. These parameters, however, do not allow for capturing local variations in axial power, introducing parameters capturing local effects through correlating heat flux at dryout, $\Phi_{DO,z}$. Such correlations capture only the effect of local variation in axial power, or correlating $X_{DO}$ against both types of parameters, i.e. BL, AL and $\Phi_{DO,z}$ in an attempt to capture both upstream history and local effect.

According to the invented method, dryout time can be estimated using a formula that comprises a single mathematical transformation to the axial power profile during steady-state reactor operation. It is intended to capture the experimentally determined memory effects of the film and the water droplet formation along the fuel assembly, which is equivalent to capturing both upstream history and local power variation along a fuel rod bundle. In one embodiment, the axial power profile transformation, $I_2$, is defined as in Equation (5):

$$I_2 = \frac{1}{x(Z_{DO})} \int_{ZXO}^{Z_{DO}} x(z) dz \quad (5)$$

where $x(z)$ is the steam quality profile along the fuel bundle.I In steady-state operation, Equation (5) is equivalent to Equation (6):

$$I_2 = \int_{ZXO}^{Z_{DO}} \int_{ZXO}^{z} q(z1) dz1 \, dz \quad (6)$$

The formula includes a function q(z1), where q is the normalized local power along the experienced power profile. z and z1 are local spatial variables related to a longitudinal direction of the nuclear fuel arrangement, parallel to the direction in which a fuel rod in the fuel arrangement extends. The integration extends from the onset of net boiling, ZX0. The onset of net boiling is defined as the average enthalpy of the coolant reaching saturation or equivalently zero steam quality. The integration is ended at $Z_{DO}$, which is defined as the axial position for dryout and is located at or below end of heated length, EHL.

2. Non-linear correlation form that establishes relationship between steady-state dryout condition and independent variables.

One embodiment of the invented non-linear correlation form is described as follows.

2.1 Critical steam quality is expressed by a mathematical product of functions describing flow, axial power profile, R-factor, and pressure dependence. Some of these functions can also be additive. Function(s) describing R-factor and pressure dependence can be either additive or multiplicative or both. The general and basic steady-state dryout correlation form is:

$$X_{DO} = f_1(G) f_2(I_2) f_3(R) f_4(P) + \text{optional terms}$$

where:

$X_{DO}$ is the local steam quality at dryout $f_1(G)$ is a function describing flow dependence, $f_2(I_2)$ is a function describing axial power profile dependence, $f_3(R)$ is a function describing R-factor dependence, and $f_4(P)$ is a function describing pressure dependence.

The optional terms constitute less significant minor corrections that can be added in order to adapt the correlation to the particular case.

2.2 Flow dependence is described by an exponential function, which, in the exponent, includes another exponential function. One embodiment is set forth in Equation (7):

$$f_1(G) = e^{\left(\frac{1}{1+e^{(\alpha_1 + \alpha_2 G)}}\right)} \quad (7)$$

where $\alpha_1$ (<0) and $\alpha_2$ (>0) are regression coefficients, and

G is the mass flux or flow rate of the coolant, for example in kg/m²s.

2.3 Axial power profile dependence is described as an exponential function of the mathematical transformation to describe the shape of the axial power profile. In one embodiment, axial power profile dependence is set forth as in Equation (8):

$$f_2(I_2) = e^{\left(\frac{\alpha_3}{I_2}\right)} \quad (8)$$

where $\alpha_3$ (<0) is a regression coefficient, and $I_2$ is the axial power profile transformation described above.

2.4 The R-factor dependence is described as an exponential function of R-factor or an additive term. In one embodiment, it is expressed as in Equation (9):

$$f_3(R) = e^{(\alpha_4 R)} \tag{9}$$

where $\alpha_4 (<-1)$ is a regression coefficient, and

R is the R-factor, which is the weighted local power influence from the neighbour rods. Such weighting schemes are known from prior art.

2.5 Pressure dependence is described as a product of reactor coolant properties raised to certain powers. The properties are selected in such a way that the product extrapolates to approximately zero both at zero pressure and at critical pressure (about 22 MPa) and have a single maximum at intermediate pressures as is desired from theoretical and experimental results. In one embodiment, it is expressed as in Equation (10):

$$f_4(P) = \rho_{rel}^{\alpha_5} h_{fg}^{\alpha_6} \tag{10}$$

where P is the pressure of the coolant, $\alpha_5 (<1)$ and $\alpha_6 (>1)$ are regression coefficients, $\rho_{rel}$ is the relative steam density defined as $\rho_V / \rho_{Vnom}$ where $\rho_V$ is the density of the vaporized cooling medium at the actual pressure and $\rho_{Vnom}$ is the vapour density at nominal system pressure (typically 7 MPa), and $h_{fg}$ is the latent heat for evaporation of the cooling medium.

3. Explicit treatment of the effects reactor operation transients has on dryout conditions in a fuel rod bundle.

The prior art approach has been to assume that all changes in time during the transient are so slow that the time derivatives can be approximated by zero, i.e. quasi steady-state is assumed. This approach is then demonstrated to be conservative sometimes by modifying the fitting coefficients. In general, however, this assumption is invalid: a) in many types of transients the total mass flow at the outlet can be significantly different from the mass flux at the inlet, which contradicts the assumption of a near steady-state; and b) the time scale of many transients is also of the same order of magnitude, or shorter, as the transport time through a fuel rod bundle. A typical transport time for the coolant through the fuel rod bundle is a few seconds.

In one embodiment of a method for BWR control and operation described herein, certain aspects of transient phenomenon are treated explicitly. Because dryout is defined to occur when a liquid film is no longer present on the rods surfaces (or its thickness is below a certain value), the treatment is based on the notion of a fluid particle travelling along the fuel rod bundle. This allows developing mathematical transformations for time-dependent transient axial power profile (see 3.1 below), transient flow condition (see 3.2 below), and severity of the transient against which the transient experimental test results are correlated (see 3.3 below).

3.1 Mathematical transformation describing time-dependent axial power profile is based on the fact that travelling in time and space, a fluid particle will experience a power profile different from an instantaneous profile. Thus, a reference system for axial power profile transformation should follow a fluid particle's path in time. In one embodiment, the transformation to transient axial profile, $I_2$, is defined as in Equation (11):

$$I_2 = \frac{1}{x_{particle}(Z_{DO})} \int_{ZXO}^{Z_{DO}} x_{particle}(z) dz \tag{11}$$

where $x_{particle}$ is the time-dependent steam quality profile experienced by a fluid particle moving along the fuel bundle, $Z_{DO}$ is the time-dependent axial position for dryout, z is a spatial variable related to a longitudinal direction of the nuclear fuel arrangement, parallel to the direction in which a fuel rod in the fuel arrangement extends, and wherein the integration extends from the onset of net boiling, ZX0, as defined above, to $Z_{DO}$.

The time dependence is inherent in the above Equation (11) In a particular embodiment, the time can be explicitly stated in the formula when the integration is performed along a particle path in the coordinate system following the particle path. If this is done then Equation (11) can be rewritten as the following Equation 12:

$$I_2(t_{DO}) = \frac{1}{x(Z_{DO}(t_{DO}))} \int_{ZX0(t_{in})}^{Z_{DO}(t_{DO})} x(t(t_{in}, z), z) dz \tag{12}$$

where t is the time during the transient, $t_{in}$ is the time during the transient when the particle experiencing dryout at $t_{DO}$ entered the bundle of fuel rods, z is a spatial variable related to a longitudinal direction of the nuclear fuel arrangement, parallel to the direction in which a fuel rod in the fuel arrangement extends, $t_{DO}$ is the time when a fluid particle is experiencing dryout, $Z_{DO}(t_{DO})$ is the time-dependent axial position for dryout for this fluid particle, and $ZX0(t_{in})$ is the point where this fluid particle reaches the point of net boiling.

Formulas (11) and (12) thus correspond to formula (5) above (which describes the steady state), but have been amended in order to take transient phenomena into account.

3.2 Coolant mass flux can be expressed as a product of the density and the velocity, which propagate through the fuel rod bundle on different time scales. This can be achieved by a mathematical transformation describing time-dependent flow condition. In one embodiment, transient dryout data are correlated against the bundle inlet mass flux when the fluid particle enters the bundle.

3.3 Severity of transient effects is captured through the introduction of a flow acceleration term. In one embodiment the acceleration term Acc is defined as in Equation (13):

$$Acc = \int_0^{Z_{DO}} \frac{1}{u_f^2(t, z)} \frac{\partial u}{\partial t} dz \tag{13}$$

where $u_f$ is axial velocity of the liquid film or its approximation, and the other expressions are as defined above. A second order polynomial ($\alpha_7 Acc^2$) of the acceleration term may be added to the axial power profile transformation when correlating transient test data, so that the following is obtained: $I_2 + \alpha_7 Acc^2$, where $\alpha_7$ is a fitting coefficient specific for the specific fuel arrangement used.

In one embodiment, a combined formula that can be used in a method described herein can be as set forth in Equation (14):

$$X_{DO} = e^{\left(\frac{1}{1+e^{(\alpha_1+\alpha_2 G)}} + \frac{\alpha_3}{I_2+f(Acc)} + \alpha_4 R\right)} p_{rel}^{\alpha_5} h_{fg}^{\alpha_6} \qquad (14)$$

with parameters as previously defined in either steady-state or transient application.

It can be noted that according to the above example, only 7 significant fitting coefficients are used. The formula can therefore easily be adapted to a particular used nuclear fuel arrangement.

The formula disclosed herein thus describes the local steam quality at dryout. Based on this information, the dryout properties in different points, for example the dryout margin, or the minimum critical power ratio (MCPR), can be calculated for the whole nuclear reactor.

Based on a large database (several thousand dryout data points) from experiments, previously unknown relations and dependencies among the main variables have been detected, and the surprising idea that that the variables flow, the axial power distribution, the R-factor and the pressure dependence can be covered by separate factors in a formula that describes the dryout properties has been conceived. A major advantage of at least one embodiment of the present invention is that the flow and the axial power distribution can be described as separate factors.

The sole FIGURE shows very schematically a nuclear energy plant according to the invention. The nuclear energy plant comprises a nuclear light water reactor of the boiling water reactor kind. The nuclear reactor has a reactor vessel 3 in which the reactor core 5 is located. Water is fed to the reactor vessel 3 via a water inlet 7 with the help of a pump 9. The generated steam leaves the vessel 3 via an outlet 11. Control rods 13 can be moved relative to the core 5 with the help of a control rod drive units 15.

The nuclear energy plant has a control unit 17, which suitably includes a computer. This control unit 17 is arranged to carry out a method according to any one of the preceding embodiments. The control unit 17 can thus for example be arranged to calculate the margin to dryout for different parts of the core 5 of the nuclear reactor by being arranged (programmed) to carry out a method according to the invention.

The control unit 17 can be connected to operation parameter detectors 19, arranged to detect operation parameters of the nuclear reactor during operation. The detectors 19 can directly or indirectly detect operation parameters such as the mass flow of the cooling medium (the water), the pressure of the cooling medium, the position of the control rods 13 in the reactor core 5 and the neutron flux in different parts of the core 5. It is known to a person skilled in the art how to detect such operation parameters of a nuclear reactor.

The control unit 17 is thus arranged to receive information concerning said operation parameters from the detectors 19 and to use these operation parameters when carrying out the mentioned method, for example for determining a dryout margin in different parts of the reactor core 5.

Based on the calculated dryout margin, a person responsible for the operation of the nuclear energy plant can increase or decrease the power with which the nuclear reactor operates.

Alternatively, the control unit 17 can have control outputs 21 arranged to automatically control the operation of the nuclear reactor in dependence on said method carried out by the control unit 17. It should be noted that the concept "control unit" as used herein thus includes two possibilities: either the control unit 17 constitutes a supervision unit which supplies information to a person (the operator), who can then manually control the operation of the nuclear energy plant (an open loop), or the control unit 17 can include means for automatically controlling the nuclear energy plant (a closed loop). However, in both cases the control unit preferably includes means (e.g. a computer) arranged to automatically carry out a method as described above, in order to provide information concerning the dryout properties of the nuclear reactor.

The person skilled in the art knows how to control the power of a nuclear reactor. This can for example be done by changing the mass flow of the cooling medium, with the help of the pump 9, or by changing the position of the control rods 13, with the help of the control rod drive unit 15. The outputs 21 from the control unit 17 can thus be arranged to change for example the mass flow of the cooling medium or the position of the control rods 13.

The invention also provides a computer program product 23 directly loadable into the internal memory of a computer which can form part of the control unit 17. The computer program product 23 comprises a computer program configured to carry out a method according to the invention.

Finally, a method according to the invention for operating a nuclear energy plant that comprises a nuclear light water reactor of the boiling water reactor kind may comprise: providing information concerning operation parameters of the nuclear reactor, optionally by means of parameter detectors; using this information in a method as described herein; and controlling the operation of the nuclear reactor in response to the outcome of the method. The operation of the nuclear reactor can be controlled by a person responsible for the operation or, alternatively, automatically, for example by a control unit 17 as described above.

The terms "first," "second," and the like, herein do not denote any order, quantity, or importance, but rather are used to distinguish one element from another.

The terms "a" and "an" herein do not denote a limitation of quantity, but rather denote the presence of at least one of the referenced item.

Although the invention has been described with reference to particular embodiments thereof, it will be understood by one of ordinary skill in the art, upon a reading and understanding of the foregoing disclosure, that numerous variations and alterations to the disclosed embodiments will fall within the spirit and scope of this invention and of the appended claims.

The invention claimed is:

1. A method of estimating when dryout may occur in a nuclear light water reactor of the boiling water reactor kind, which reactor includes a nuclear fuel arrangement, which method is characterised in that it includes:

receiving data that indicates operation parameters for the reactor; and processing the data by the use of a formula which expresses the local dryout property of the nuclear reactor, wherein said formula includes at least a first and a second factor, wherein the first factor is a first function that describes how the dryout property depends on the flow of the cooling medium through the nuclear fuel arrangement and the second factor is a second function that describes how the dryout property depends on the axial power profile of the nuclear fuel arrangement, wherein said formula also includes a third function, wherein the third function describes how the dryout property depends on the R-factor of the nuclear fuel arrangement, wherein the R-factor is the weighted local power influence from the neighbour nuclear fuel rods,
wherein said third function is a factor in the formula,
wherein said formula also includes a fourth function, wherein the fourth function describes how the dryout property depends on the pressure of the cooling medium in the nuclear fuel arrangement, and
wherein said fourth function is a factor in the formula,
wherein the first, second, third and fourth functions independently of each other describe said flow dependence said axial power profile dependence, said R-factor dependence and said pressure dependence respectively.

2. A method according to claim 1, wherein the fourth function includes an entity $h_{fg}$, where $h_{fg}$ is the latent heat for evaporation of the cooling medium.

3. A method according to claim 1, wherein the fourth function includes an entity proportional to the density of the vapour of the cooling medium at the actual pressure.

4. A method according to claim 1, wherein said formula includes an exponential function, which, in the exponent, includes another exponential function.

5. A method according to claim 1, wherein the formula includes a number of variables, a number of constants, and a number of fitting coefficients, wherein said fitting coefficients are considered as constants for the used nuclear fuel arrangement within certain limited variations of the operation conditions for the nuclear reactor.

6. A method according to claim 5, wherein the formula is such that only the fitting coefficients have to be adjusted in order for the formula to be applicable to a particular nuclear fuel arrangement.

7. A method according to claim 5, comprising using fewer than 10 fitting coefficients that play an important role in order for the formula to express the dryout property.

8. A method of estimating when dryout may occur in a nuclear light water reactor of the boiling water reactor kind, which reactor includes a nuclear fuel arrangement, which method is characterised in that it includes receiving data that indicates operation parameters for the reactor, and processing of the data by the use of a formula which expresses the local dryout property of the nuclear reactor,
wherein said formula includes at least a first and a second factor, wherein the first factor is a first function that describes how the dryout property depends on the flow of the cooling medium through the nuclear fuel arrangement, and
the second factor is a second function that describes how the dryout property depends on the axial power profile of the nuclear fuel arrangement,
wherein said formula also includes a third function, wherein the third function describes how the dryout property depends on the R-factor of the nuclear fuel arrangement,
wherein the R-factor is the weighted local power influence from the neighbour nuclear fuel rods,
wherein said third function is a factor in the formula,
wherein said formula also includes a fourth function, wherein the fourth function describes how the dryout property depends on the pressure of the cooling medium in the nuclear fuel arrangement, and
wherein said fourth function is a factor in the formula,
wherein the first, second, third and fourth functions independently of each other describe said flow dependence said axial power profile dependence, said R-factor dependence and said pressure dependence respectively, and
wherein said second function comprises a single mathematical transformation to the axial power profile which includes at least one variable related to a longitudinal direction of the nuclear fuel arrangement, parallel to the direction in which a fuel rod in the fuel arrangement extends.

9. A method according to claim 8, wherein the transformation is of the following form:

$$I_2 = \frac{1}{x(Z_{DO})} \int_{ZX0}^{Z_{DO}} x(z)\,dz$$

where $x(z)$ is the steam quality profile along the fuel bundle,
z is a local spatial variable related to a longitudinal direction of the nuclear fuel arrangement, parallel to the direction in which a fuel rod in the fuel arrangement extends, and
wherein the integration extends from the onset of net boiling, ZX0 and the integration ends at $Z_{DO}$, which is defined as the axial position for dryout.

10. A method according to claim 8, wherein the transformation takes transient phenomena into account and has the following form:

$$I_2(t_{DO}) = \frac{1}{x(Z_{DO}(t_{DO}))} \int_{ZX0(t_{in})}^{Z_{DO}(t_{DO})} x(t(t_{in}, z), z)\,dz$$

where z is a local spatial variable related to a longitudinal direction of the nuclear fuel arrangement, parallel to the direction in which a fuel rod in the fuel arrangement extends,
t is the time during the transient,
$t_{in}$ is the time during the transient when the particle experiencing dryout at $t_{DO}$ entered the bundle of fuel rods,
$t_{DO}$ is the time when a fluid particle is experiencing dryout,
$Z_{DO}(t_{DO})$ is the time-dependent axial position for dryout for this fluid particle, and
$ZX0(t_{in})$ is the point where this fluid particle reaches the point of net boiling.

11. A method according to claim 8, wherein said formula includes an exponential function, which, in the exponent, includes another exponential function, and wherein the transformation forms part of the exponent in the first mentioned exponential function.

12. A method according to claim 1, wherein said first function includes an entity G, where G is the mass flow of cooling medium through the nuclear fuel arrangement per area and time, wherein G is constant in a stationary state of the operation of the nuclear reactor.

13. A method according to claim 12, wherein said formula includes an exponential function, which, in the exponent, includes another exponential function, and wherein the entity G, appears in the exponential function that appears in the exponent of the first mentioned exponential function.

14. A method according to claim 1, wherein the formula has exactly, or at least substantially, the following form:

$$X_{DO} = e^{\left(\frac{1}{1+e^{(\alpha_1+\alpha_2 G)}} + \frac{\alpha_3}{I_2+f(Acc)} + \alpha_4 R\right)} \rho_{rel}^{\alpha_5} h_{fg}^{\alpha_6}$$

where $X_{DO}$ is the predicted local steam quality at dryout,

G is the mass flow of cooling medium through the nuclear fuel arrangement per area and time, $I_2$ is the transformation of the axial power distribution, $f(Acc)$ is a function of a flow acceleration term, which function describes transient effects captured through the flow acceleration term, R is the weighted local power influence from the neighbour nuclear fuel rods, $\rho_{rel}$ is the relative steam density, $h_{fg}$ is the latent heat for evaporation of the cooling medium, $\alpha_1$ to $\alpha_6$ are fitting coefficients specific for the specific fuel arrangement used.

15. A method according to claim 14, wherein $$f(Acc) = \alpha_7 Acc^2$$

where the acceleration term Acc is defined as $$Acc = \int_0^{Z_{DO}} \frac{1}{u_f^2(t,z)} \frac{\partial u_f}{\partial t} dz$$

where $u_f$ is the axial velocity of the liquid film on the nuclear fuel rods or its approximation, t is the time during the transient, z is a local spatial variable related to a longitudinal direction of the nuclear fuel arrangement, parallel to the direction in which a fuel rod in the fuel arrangement extends, $Z_{DO}$ is defined as the time dependent axial position for dryout, and $\alpha_7$ is a fitting coefficient specific for the specific fuel arrangement used.

16. A method of operating a nuclear energy plant comprising a nuclear light water reactor of the boiling water reactor kind, wherein said method comprising:

receiving information concerning operation parameters of the nuclear reactor, using this information to estimate the dryout time of the reactor in a method according to claim 1, and controlling the operation of the nuclear reactor in dependence on the result of the estimate.

17. A method according to claim 8, wherein said first function includes an entity G, where G is the mass flow of cooling medium through the nuclear fuel arrangement per area and time, wherein G is constant in a stationary state of the operation of the nuclear reactor.

18. A method according to claim 8, wherein the formula has exactly, or at least substantially, the following form:

$$X_{DO} = e^{\left(\frac{1}{1+e^{(\alpha_1+\alpha_2 G)}} + \frac{\alpha_3}{I_2+f(Acc)} + \alpha_4 R\right)} \rho_{rel}^{\alpha_5} h_{fg}^{\alpha_6}$$

where $X_{DO}$ is the predicted local steam quality at dryout,

G is the mass flow of cooling medium through the nuclear fuel arrangement per area and time, $I_2$ is the transformation of the axial power distribution, $f(Acc)$ is a function of a flow acceleration term, which function describes transient effects captured through the flow acceleration term, R is the weighted local power influence from the neighbour nuclear fuel rods, $\rho_{rel}$ is the relative steam density, $h_{fg}$ is the latent heat for evaporation of the cooling medium, $\alpha_1$ to $\alpha_6$ are fitting coefficients specific for the specific fuel arrangement used.

* * * * *